United States Patent
Fujiwara et al.

(10) Patent No.: US 10,459,378 B2
(45) Date of Patent: Oct. 29, 2019

(54) IMAGE FORMING APPARATUS AND PROGRAM COMPENSATING FOR ECCENTRIC COMPONENTS

(71) Applicant: KONICA MINOLTA, INC., Chiyoda-ku, Tokyo (JP)

(72) Inventors: Takashi Fujiwara, Tokyo (JP); Jun Onishi, Hino (JP); Masahito Takano, Koganei (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/964,141

(22) Filed: Apr. 27, 2018

(65) Prior Publication Data

US 2018/0335734 A1    Nov. 22, 2018

(30) Foreign Application Priority Data

May 19, 2017   (JP) .................................. 2017-099399

(51) Int. Cl.

| G03G 15/20 | (2006.01) |
| G03G 15/00 | (2006.01) |
| G03G 15/16 | (2006.01) |
| H04N 1/56 | (2006.01) |
| H04N 1/50 | (2006.01) |

(52) U.S. Cl.
CPC ......... *G03G 15/2028* (2013.01); *G03G 15/55* (2013.01); *G03G 15/602* (2013.01); *G03G 15/607* (2013.01); *H04N 1/56* (2013.01); *G03G 15/1615* (2013.01); *G03G 15/5004* (2013.01); *G03G 2215/2045* (2013.01); *G03G 2221/1657* (2013.01); *H04N 1/506* (2013.01)

(58) Field of Classification Search
CPC ....................... G03G 15/607; G03G 15/2028
See application file for complete search history.

(56) References Cited

U.S. PATENT DOCUMENTS

| 2006/0088338 A1* | 4/2006 | Matsuda | ............ G03G 15/0131 399/167 |
| 2008/0175612 A1* | 7/2008 | Oikawa | ................ G03G 15/161 399/66 |

(Continued)

FOREIGN PATENT DOCUMENTS

| JP | 11-202576 A | 7/1999 |
| JP | 2013203048 A | * 10/2013 |

*Primary Examiner* — Walter L Lindsay, Jr.
*Assistant Examiner* — Arlene Heredia
(74) *Attorney, Agent, or Firm* — Buchanan Ingersoll & Rooney PC

(57) ABSTRACT

An image forming apparatus includes: a driving roller that conveys a paper sheet; a detector that detects a desired point on the driving roller; and a hardware processor that: acquires a waveform signal indicating one of a change in an image forming position with respect to the paper sheet and a change in a sheet conveyance velocity; extracts a synchronous waveform signal from the waveform signal acquired by the hardware processor, the synchronous waveform signal being synchronized with one revolution of the driving roller, the one revolution being detected by the detector; and inputs a drive signal to a drive source of the driving roller, the drive signal being input to weaken an amplitude of the synchronous waveform signal extracted by the hardware processor.

16 Claims, 9 Drawing Sheets

(56) References Cited

U.S. PATENT DOCUMENTS

2014/0334855 A1* 11/2014 Onishi ............... G03G 15/1615
                                                            399/301
2017/0142286 A1* 5/2017 Hirota ................. H04N 1/3873
2017/0219049 A1* 8/2017 Takano .................... F16H 1/22
2018/0259883 A1* 9/2018 Takano ................. G03G 15/16

* cited by examiner

| CUMULATIVE IMAGE FORMATION SHEET NUMBER | AMPLITUDE LEVEL CORRECTION VALUE |
|---|---|
| 100 SHEETS | 1.5 TIMES |
| 200 SHEETS | 2.0 TIMES |
| ⋮ | ⋮ | ns
IMAGE FORMING APPARATUS AND PROGRAM COMPENSATING FOR ECCENTRIC COMPONENTS

The entire disclosure of Japanese patent Application No. 2017-099399, filed on May 19, 2017, is incorporated herein by reference in its entirety.

BACKGROUND

Technological Field

The present invention relates to image forming apparatuses and programs.

Description of the Related Art

A conventionally-known electrophotographic image forming apparatus forms an image on a paper sheet by forming a toner image through toner development of an electrostatic latent image formed on a photosensitive member, transferring the formed toner image onto the paper sheet with a transfer unit, and heating and fixing the toner image while nipping and conveying the paper sheet at a fixer.

In such an apparatus, the driving roller of the fixer is eccentric due to component precision or assembly error, and the amount of sheet feed varies with eccentricity cycles. As a result, the image position might shift at the transfer unit. A change in the amount of sheet feed due to eccentricity is caused by a difference in the circumferential velocity caused by a change in the equivalent radius of the driving roller.

To counter this, JP 11-202576 A suggests a technology that includes: an encoder roller that detects a change in the position or the velocity of an intermediate transfer belt; an encoder that outputs a detection signal in accordance with a change in rotation of the rotary shaft of the encoder roller; a clock signal generation circuit that generates a clock signal; and an encoder roller eccentric component removing unit that removes eccentric components of the rotary shaft of the encoder roller from the detection signal by using the clock signal. A belt driving roller is controlled in accordance with a result output from the encoder roller eccentric component removing unit, so that changes in the position or the velocity of the intermediate transfer belt are reduced, and registration shift or uneven development in an output image is prevented.

However, the technology disclosed in JP 11-202576 A is a system using an intermediate transfer belt, and cannot cancel eccentric components if a slip occurs between the driving roller and the belt due to an increase caused in load by bleed or the like.

SUMMARY

The present invention has been made in view of the above problem, and an object thereof is to prevent degradation of image position accuracy due to eccentricity of a driving roller.

To achieve the abovementioned object, according to an aspect of the present invention, an image forming apparatus reflecting one aspect of the present invention comprises:
  a driving roller that conveys a paper sheet;
  a detector that detects a desired point on the driving roller; and
  a hardware processor that:

acquires a waveform signal indicating one of a change in an image forming position with respect to the paper sheet and a change in a sheet conveyance velocity;
extracts a synchronous waveform signal from the waveform signal acquired by the hardware processor, the synchronous waveform signal being synchronized with one revolution of the driving roller, the one revolution being detected by the detector; and
inputs a drive signal to a drive source of the driving roller, the drive signal being input to weaken an amplitude of the synchronous waveform signal extracted by the hardware processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 9 shows an example of a correction table.

DETAILED DESCRIPTION OF EMBODIMENTS

Hereinafter, one or more embodiments of the present invention will be described with reference to the drawings. However, the scope of the invention is not limited to the disclosed embodiments. In this embodiment, a color image forming apparatus will be described as an example. However, the present invention is not limited to this, and can also be applied to a monochrome image forming apparatus, for example.

Figure 1:
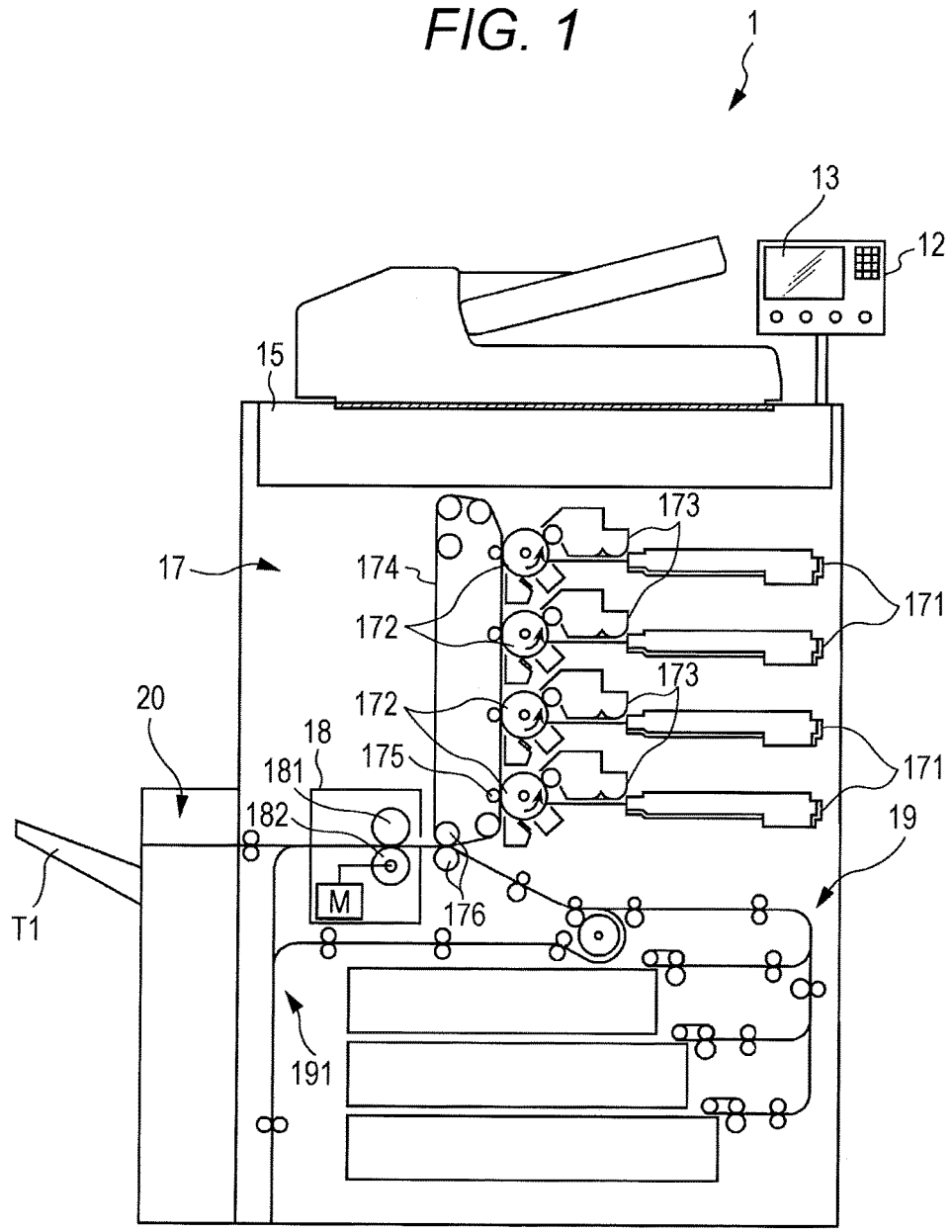
FIG. 1 is a diagram schematically showing the configuration of an image forming apparatus.
Figure 2:
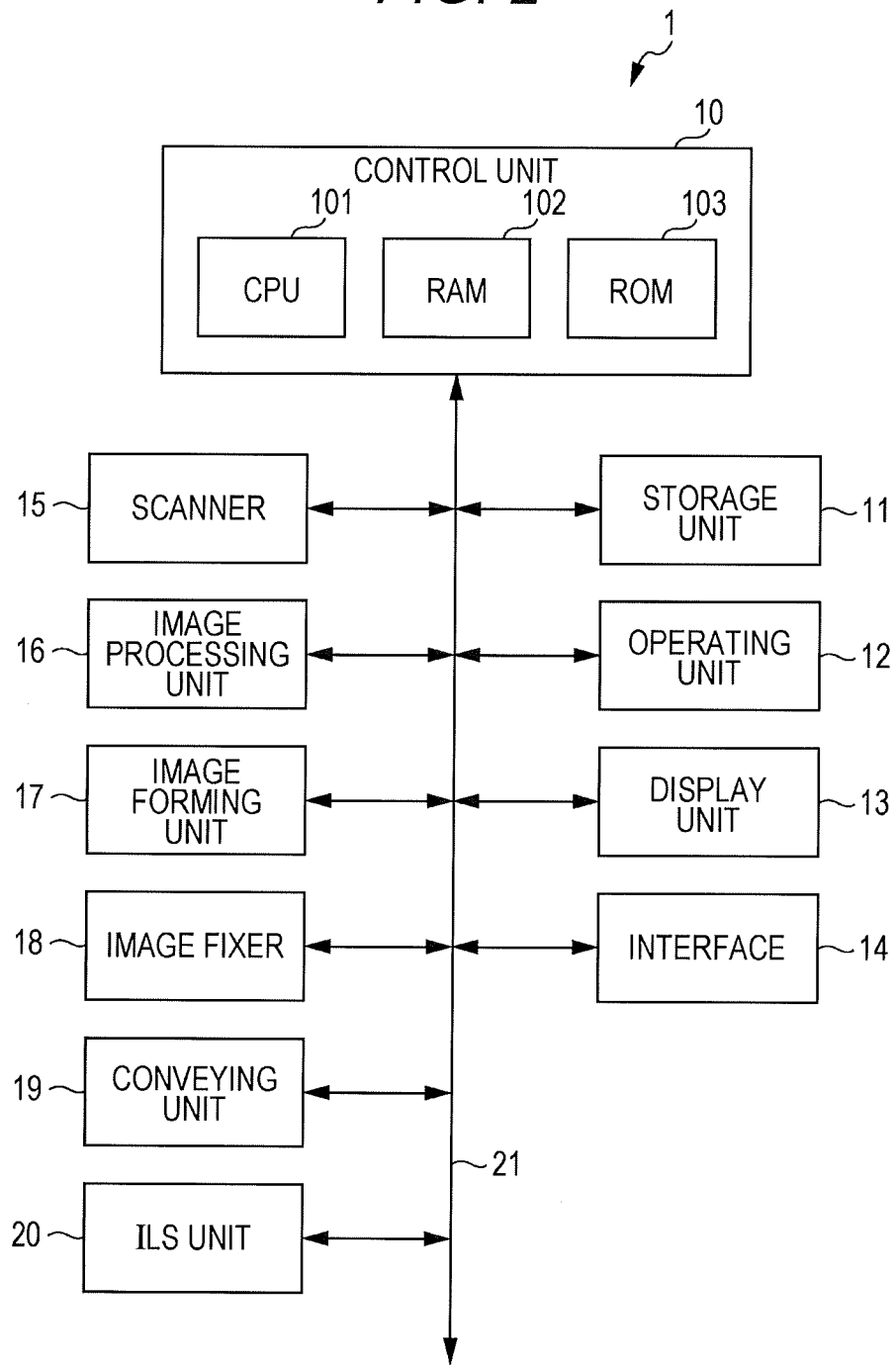
FIG. 2 is a block diagram showing the principal functional configuration of an image forming apparatus.

FIG. 1 is a diagram schematically showing the configuration of an image forming apparatus 1 that is an embodiment of the present invention. FIG. 2 is a block diagram showing the principal functional configuration of the image forming apparatus 1.

The image forming apparatus 1 includes a control unit 10 that includes a central processing unit (CPU) 101, a random access memory (RAM) 102, and a read only memory (ROM) 103, a storage unit 11, an operating unit 12, a display unit 13, an interface 14, a scanner 15, an image processing unit 16, an image forming unit 17, an image fixer 18, a conveying unit 19, and an in-line image sensor (ILS) unit 20.

Via a bus 21, the control unit 10 is connected to the storage unit 11, the operating unit 12, the display unit 13, the interface 14, the scanner 15, the image processing unit 16, the image forming unit 17, the image fixer 18, the conveying unit 19, and the ILS unit 20.

The CPU 101 reads and executes control programs stored in the ROM 103 or the storage unit 11, and performs various calculation processes.

The RAM 102 provides a work memory space for the CPU 101, and temporarily stores data.

The ROM 103 stores various control programs to be executed by the CPU 101, setting data, and the like. Instead of the ROM 103, a rewritable nonvolatile memory, such as an electrically erasable programmable read only memory (EEPROM) or a flash memory, may be used.

The control unit 10 including the CPU 101, the RAM 102, and the ROM 103 collectively controls the respective components of the image forming apparatus 1 in accordance with the above various control programs. For example, the control unit 10 causes the image processing unit 16 to perform predetermined image processing on image data and store the image data into the storage unit 11. The control unit 10 also causes the conveying unit 19 to convey a paper sheet, and causes the image forming unit 17 to form an image on the paper sheet in accordance with the image data stored in the storage unit 11.

The storage unit 11 is formed with a dynamic random access memory (DRAM), a hard disk drive (HDD), or the like, which is a semiconductor memory, and stores image data obtained with the scanner 15, image data input from the outside via the interface 14, and the like. Alternatively, such image data and the like may be stored in the RAM 102.

The operating unit 12 includes input devices, such as operation keys and a touch panel placed on the screen of the display unit 13. The operating unit 12 converts an operation that is input through these input devices into an operation signal, and outputs the operation signal to the control unit 10.

The display unit 13 includes a display device, such as a liquid crystal display (LCD), and displays an operation screen or the like that shows the state of the image forming apparatus 1 or the contents of the operation input through the touch panel.

The interface 14 is a means to perform data transmission/reception with an external computer, another image forming apparatus, or the like, and is formed with a serial interface of one of various kinds, for example.

The scanner 15 reads an image formed on a paper sheet, generates image data including single-color image data of each of the color components R (red), G (green), and B (blue), and stores the image data into the storage unit 11.

The image processing unit 16 includes a rasterizing unit, a color converting unit, a tone correcting unit, and a halftone processing unit, for example. The image processing unit 16 performs various kinds of image processing on the image data stored in the storage unit 11, and stores the processed image data into the storage unit 11.

Figure 3:
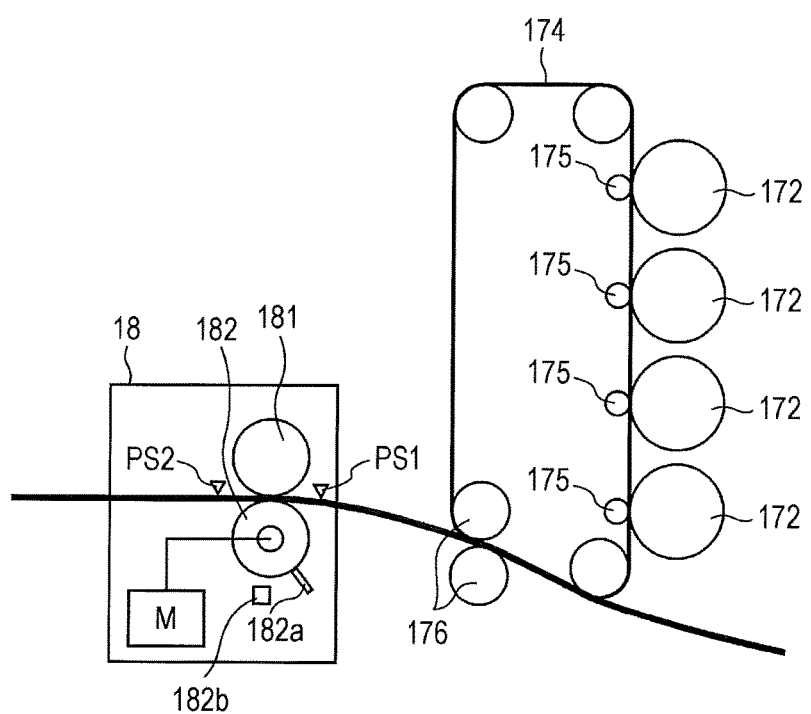
FIG. 3 is a schematic diagram showing the configurations of the image forming unit and the image fixer.

FIG. 3 is a schematic diagram showing the configurations of the image forming unit 17 and the image fixer 18.

As shown in FIGS. 1 and 3, the image forming unit 17 forms an image on a paper sheet in accordance with the image data stored in the storage unit 11. The image forming unit 17 includes four sets of an exposing unit 171, a photosensitive drum 172, and a developing unit 173. These four sets correspond to the respective color components C (cyan), M (magenta), Y (yellow), and K (black). The image forming unit 17 also includes an intermediate transfer member 174, primary transfer rollers 175, and secondary transfer rollers 176.

Each exposing unit 171 includes a laser diode (LD) as a light emitting element. The exposing unit 171 drives the LD in accordance with image data, irradiates and exposes the charged photosensitive drum 172 with laser light, and forms an electrostatic latent image on the photosensitive drum 172. The developing unit 173 supplies toner (color material) of a predetermined color (one of C, M, Y, and K) onto the charged photosensitive drum 172 with a charged developing roller, and develops the electrostatic latent image formed on the photosensitive drum 172.

Images (single-color images) formed with toner of C, M, Y, and K on the four photosensitive drums 172 corresponding to C, M, Y, and K, respectively, are transferred onto the intermediate transfer member 174 one by one from the respective photosensitive drums 172 in a superimposing manner.

The intermediate transfer member 174 is a semiconductive endless belt suspended rotatably supported by rollers, and is driven to rotate by rotation of the rollers. The intermediate transfer member 174 rotates as each transfer member conveyance roller rotates at the time of toner image transfer.

The intermediate transfer member 174 is pressed against the respective photosensitive drums 172 by the primary transfer rollers 175 on the opposite side. A transfer current corresponding to an applied voltage flows in each of the primary transfer rollers 175. As a result, the respective toner images developed on the surfaces of the photosensitive drums 172 are sequentially transferred onto the intermediate transfer member 174 by the respective primary transfer rollers 175 (primary transfer).

The secondary transfer rollers 176 are pressed by the intermediate transfer member 174, to rotate with the intermediate transfer member 174. The secondary transfer rollers 176 transfer the toner images in the respective colors of Y, M, C, and K formed as a result of the transfer by the intermediate transfer member 174, onto a paper sheet conveyed from a sheet feeder unit (secondary transfer). That is, as the paper sheet passes through the transfer nip portion formed between the secondary transfer rollers 176, the toner images on the intermediate transfer member 174 are secondarily transferred onto the paper sheet. Any residual toner on the intermediate transfer member 174 is removed by a cleaning unit (not shown).

As shown in FIG. 3, the image fixer 18 includes a heating roller 181 and a pressure roller 182, and performs a fixing process to fix the toner onto the paper sheet by heating and pressing the paper sheet onto which the toner has been transferred.

The heating roller 181 includes therein a halogen lamp heater (not shown) extending in the direction of the rotary shaft. The halogen lamp heater generates heat when energized under the control of the control unit 10. A fixing belt (not shown) is stretched over the outer periphery of the heating roller 181. The heating roller 181 forms a fixing nip portion that nips and conveys the paper sheet between the heating roller 181 and the pressure roller 182 via the fixing belt.

The pressure roller 182 is pushed in the direction toward the heating roller 181 by an elastic member (not shown), is pressed against the heating roller 181 via the fixing belt, and forms the fixing nip portion with the heating roller 181. The pressure roller 182 is driven to rotate by the rotational driving force of a driving motor M under the control of the control unit 10, and functions as a driving roller.

Further, the roller diameter of the pressure roller 182 is different from the roller diameters of the conveyance rollers (the secondary transfer rollers 176, the sheet discharge roller (not shown), and the like) located on the upstream and downstream sides of the pressure roller 182.

The pressure roller 182 is also provided with a protruding piece 182a and a sensor 182b that senses the protruding piece 182a, the protruding piece 182a and the sensor 182b serving as the detector. The sensor 182b is designed to be capable of sensing that the protruding piece 182a has been rotated one revolution by rotation of the pressure roller 182. That is, it is possible to sense any desired point on the pressure roller 182.

The detector is not limited to any particular form as long as it can detect any desired point on the pressure roller 182. Other than that, an encoder or the like may be used, for example.

The driving motor M as the drive source is an FG servo motor, for example, and the rotation speed is controlled under the control of the control unit 10.

A first sensor PS1 and a second sensor PS2 are further provided on the upstream and downstream sides of the fixing nip portion.

The first sensor PS1 and the second sensor PS2 are optical sensors, for example, and detect a paper sheet passing through the fixing nip portion.

The distance from the fixing nip portion to the second sensor PS2 is set at a length that is not an integral multiple of the circumferential length of the pressure roller 182.

As shown in FIG. 1, the conveying unit 19 includes sheet conveyance rollers that convey paper sheets, and conveys the paper sheets through a predetermined conveyance path. The conveying unit 19 includes a reversing mechanism 191 that reverses a paper sheet on which a fixing process has been performed by the image fixer 18, and then conveys the paper sheet to the secondary transfer rollers 176.

In the image forming apparatus 1, in a case where images are to be formed on both surfaces of a paper sheet, the paper sheet is reversed by the reversing mechanism 191. After the images are formed on both surfaces, the paper sheet is conveyed to the ILS unit 20. In a case where an image is to be formed on one surface of a paper sheet, the paper sheet is not reversed by the reversing mechanism 191. After the image is formed on the one surface, the paper sheet is conveyed to the ILS unit 20.

The ILS unit 20 as the reader is an in-line image sensor that reads an image formed on a paper sheet.

After the image is read by the ILS unit 20, the paper sheet is discharged onto a sheet catch tray T1.

In the apparatus configuration described above, the pressure roller 182, which is a driving roller, is eccentric due to component precision or assembly error, and the amount of sheet feed varies with eccentricity cycles. As a result, the image position might shift at the transfer nip portion where the secondary transfer is performed. A change in the amount of sheet feed due to eccentricity is caused by a difference in the circumferential velocity caused by a change in the equivalent radius of the driving roller.

The image forming apparatus 1 according to this embodiment is designed to perform a process of adjusting the drive signal for driving the driving roller, to prevent image position deviation due to eccentricity of the driving roller (the pressure roller 182).

In the description below, a method of generating the drive signal for driving the driving roller will be described.

<First Mode>

Figure 4:
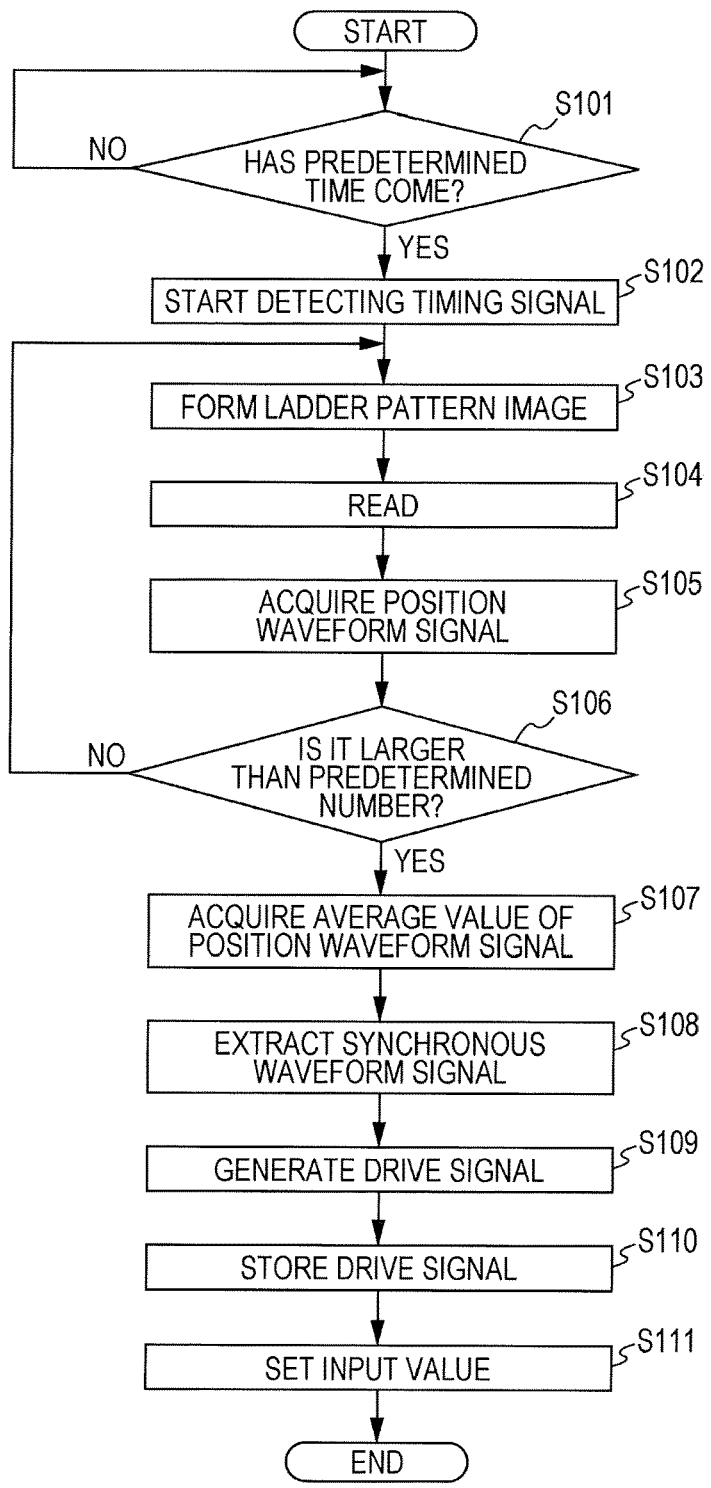
FIG. 4 is a flowchart showing a method of generating a drive signal in a first mode.
Figure 5:
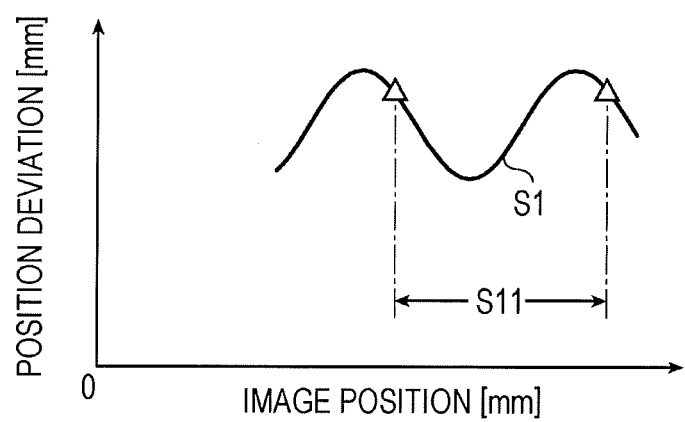
FIG. 5 is a conceptual diagram for explaining the method of generating the drive signal in the first mode.

FIG. 4 is a flowchart showing a method of generating the drive signal in a first mode. FIG. 5 is a conceptual diagram for explaining the method of generating the drive signal in the first mode.

In the first mode, the control unit 10 functions as the signal acquirer (the position waveform signal acquirer), the extractor, and the controller.

First, the control unit 10 determines whether a predetermined drive signal generation time (the time at which the cumulative number of sheets having an image formed thereon reaches a predetermined number) has come (step S101).

If the predetermined time has come (step S101: YES), the control unit 10 starts detecting a timing signal for sensing one revolution of the pressure roller 182 (step S102).

The control unit 10 then creates a ladder pattern image on the paper sheet (step S103), and reads the ladder pattern image with the ILS unit 20 (step S104).

The control unit 10 then compares a preset ideal image forming position with the image forming position of the ladder pattern image read by the ILS unit 20, calculates the difference value, and acquires a position waveform signal (step S105).

The control unit 10 then determines whether the number of paper sheets on which the ladder pattern image has been formed has reached a predetermined number (step S106). If the number of paper sheets has reached the predetermined number (step S106: YES), the control unit 10 acquires a position waveform signal S1 (see FIG. 5) generated by calculating the average value of the acquired position waveform signals (step S107).

When image forming processes are successively performed on paper sheets as described above, the interval between the successive paper sheets is set at a length that is not an integral multiple of the circumferential length of the pressure roller 182.

The control unit 10 then extracts a synchronous waveform signal S11 synchronized with one revolution of the pressure roller 182 from the position waveform signal S1 acquired in step S107 (step S108). The control unit 10 generates a drive signal of the phase opposite to the waveform of the synchronous waveform signal S11, to cancel the extracted synchronous waveform signal S11 (step S109).

The control unit 10 then stores the drive signal generated in step S109 into the storage unit 11 (step S110). The control unit 10 performs setting to input the drive signal to the driving motor M in the image forming process (step S111), and ends this process.

In the image forming process thereafter, the determination in step S101 is made. If the cumulative number of sheets having an image formed thereon exceeds the predetermined number (step S101: YES), the processing in step S102 and the steps that follow is repeated, and a new synchronous waveform signal is extracted.

In acquiring the position waveform signal, the ILS unit 20 may not be provided. Instead, the user may manually scan the paper sheet on which the ladder pattern image has been formed, and thus, acquire the data.

<Second Mode>

Figure 6:
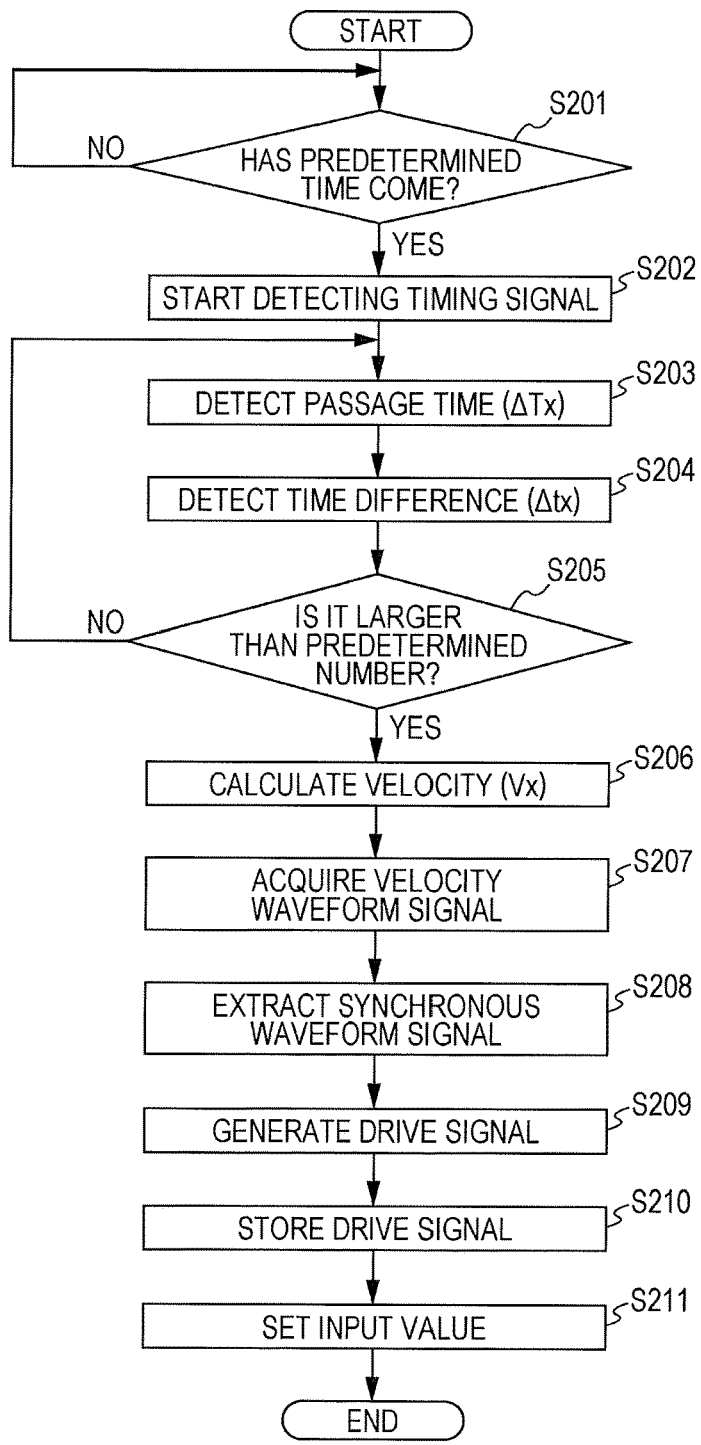
FIG. 6 is a flowchart showing a method of generating a drive signal in a second mode.
Figure 7:
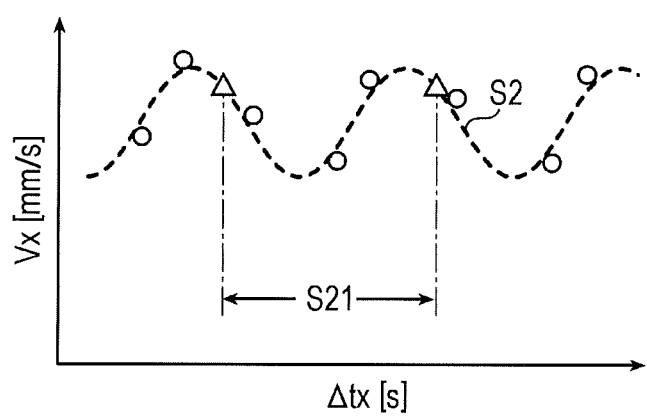
FIG. 7 is a conceptual diagram for explaining the method of generating the drive signal in the second mode.

FIG. 6 is a flowchart showing a method of generating the drive signal in a second mode. FIG. 7 is a conceptual diagram for explaining the method of generating the drive signal in the second mode.

In the second mode, the control unit 10 functions as the signal acquirer (the velocity calculator and the velocity waveform signal acquirer), the extractor, and the controller.

First, the control unit 10 determines whether a predetermined drive signal generation time (the time at which the cumulative number of sheets having an image formed thereon reaches a predetermined number) has come (step S201).

If the predetermined time has come (step S201: YES), the control unit 10 starts detecting a timing signal for sensing one revolution of the pressure roller 182 (step S202).

The control unit 10 then detects the difference (the passage time ΔTx) between the times at which the first sensor PS1 and the second sensor PS2 is turned on, sensing the edge of a paper sheet (step S203).

The control unit 10 then detects a time difference (Δtx) before the second sensor PS2 is turned on, from the time at which the timing signal is output immediately before the second sensor PS2 (step S204).

Here, the detected values (ΔTx and Δtx) are associated with each other, like ΔT1 (Δt1) for the first paper sheet and ΔT2 (Δt2) for the second paper sheet, and are then accumulated. ΔTx and Δtx are values that change depending on the phase of the pressure roller 182.

The control unit 10 then determines whether the number of sheets having an image formed thereon has reached a predetermined number (step S205). If the number has reaches the predetermined number (step S205: YES), the control unit 10 determines whether the circumferential velocity (Vx) of the pressure roller 182 at each time Δtx (step S206).

Here, the circumferential velocity (Vx) can be calculated according to X/ΔTx (X being the distance between the sensors).

The control unit 10 then plots the value calculated in step S206, and creates an approximate curve, to acquire a velocity waveform signal S2 (see FIG. 7) (step S207).

The control unit 10 then extracts a synchronous waveform signal S21 synchronized with one revolution of the pressure roller 182 from the velocity waveform signal S2 (step S208). The control unit 10 generates a drive signal of the phase opposite to the waveform of the synchronous waveform signal S21, to cancel the extracted synchronous waveform signal S21 (step S209).

The control unit 10 then stores the drive signal generated in step S209 into the storage unit 11 (step S210). The control unit 10 performs setting to input the drive signal to the driving motor M in the image forming process (step S211), and ends this process.

In the image forming process thereafter, the determination in step S201 is made, as in the first mode. If the cumulative number of sheets having an image formed thereon exceeds the predetermined number (step S201: YES), the processing in step S202 and the steps that follow is repeated, and a new synchronous waveform signal is extracted.

Although two sensors are used in this example, only a single sensor may be used to detect the top edge and the bottom edge of a paper sheet so that ΔTx can be calculated.

In a case where the process of the second mode is performed, the image forming apparatus 1 may of course be not provided with the ILS unit 20.

Figure 8:
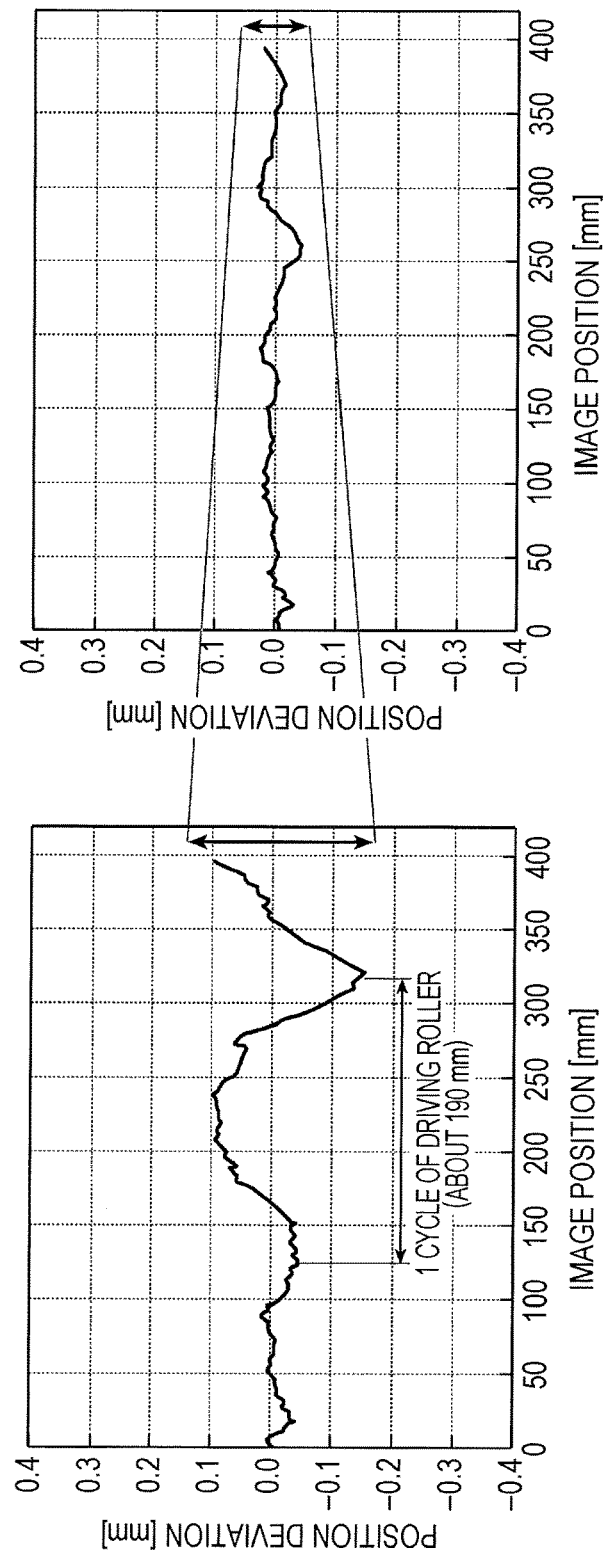
FIG. 8 is a diagram for explaining the effects of the present invention.

FIG. 8 is a diagram for explaining the effect of inputting the drive signal generated in the above process to the driving motor M.

As a result of generation of the average waveforms of position deviation in a conventional apparatus and the apparatus according to this embodiment, the position deviation in one cycle of the driving roller can be reduced to approximately 0.1 mm with the apparatus of this embodiment, while the position deviation in one cycle of the driving roller is approximately 0.25 mm with the conventional apparatus, as can be seen from FIG. 8.

As described above, according to this embodiment, the image forming apparatus 1 includes: the pressure roller 182 that conveys a paper sheet; and the detector (the protruding piece 182*a* and the sensor 182*b*) that detects a desired point on the pressure roller 182. The control unit 10 acquires a waveform signal indicating a change in the image forming position with respect to the paper sheet or a change in the sheet conveyance velocity, extracts from the acquired waveform signal a synchronous waveform signal synchronized with one revolution of the pressure roller 182 detected by the detector, and inputs the drive signal for weakening the amplitude of the extracted synchronous waveform signal to the driving motor M of the pressure roller 182.

More specifically, the control unit 10 inputs the drive signal of the opposite phase that cancels the extracted synchronous waveform signal to the driving motor M.

Because of this, the driving motor M is driven by the drive signal having the counter waveform of the eccentric component of the pressure roller 182, and accordingly, degradation of image position accuracy due to eccentricity of the pressure roller 182 can be prevented. Furthermore, a large-scale structure is unnecessary, and degradation of image position accuracy can be easily prevented while the costs and the required space are reduced.

Also, according to this embodiment, the control unit 10 acquires a waveform signal from which the periodic components of the conveyance rollers located on the upstream and downstream sides of the pressure roller 182 have been removed.

As a result, waveform signal accuracy can be increased.

Further, according to this embodiment, the roller diameter of the pressure roller 182 is different from the roller diameter of the conveyance rollers located on the upstream and downstream sides of the pressure roller 182.

Thus, the influence of external disturbance can be reduced, and waveform signal accuracy can be increased.

Also, according to this embodiment, after extracting a synchronous waveform signal, the control unit 10 inputs the synchronous waveform signal to the driving motor M of the pressure roller 182 in image forming processes for a predetermined number of sheets, and, when the number of sheets having an image formed thereon becomes larger than the predetermined number, extracts a new synchronous waveform signal.

Thus, it is possible to reduce the influence of thermal expansion or the like due to an increase in the cumulative number of sheets having an image formed thereon.

Further, according to this embodiment, in the first mode, the ILS unit 20 that reads the ladder pattern image formed on a paper sheet is provided, and the control unit 10 acquires a position waveform signal from a difference value obtained as a result of comparison between the predetermined ideal image forming position and the position of the ladder pattern image read by the ILS unit 20.

Thus, it is possible to acquire a waveform signal by using image position information.

Also, according to this embodiment, in the first mode, the ILS unit 20 reads the ladder pattern image formed on paper sheets, and the control unit 10 acquires a position waveform signal by calculating the average value of difference values obtained as a result of comparison between the ideal image forming position and the ladder pattern image positions.

Thus, robustness can be enhanced.

Further, according to this embodiment, in the second mode, first sensor PS1 and the second sensor PS2 that detect passing of paper sheets are provided. From the results of detection by these sensors, the control unit 10 calculates the passage time of each paper sheet through the pressure roller 182, and calculates the circumferential velocity of the pressure roller 182. The control unit 10 then acquires the velocity waveform signal from the results of velocity calculation performed on paper sheets.

Thus, it is possible to acquire a waveform signal by using the timing of passing of paper sheets through the fixing nip portion.

Also, according to this embodiment, in a case where a sensor is disposed on the downstream side of the pressure roller 182 in the second mode, the distance from the pressure roller 182 to the sensor is set at a length that is not an integral multiple of the circumferential length of the pressure roller 182.

Thus, it is possible to acquire a velocity waveform signal with high precision.

Further, according to this embodiment, in a case where image forming processes are successively performed on paper sheets, the sheet interval is set at a length that is not an integral multiple of the circumferential length of the pressure roller 182.

Thus, a waveform signal can be acquired with high precision.

In the above described embodiment, a new synchronous waveform signal is extracted when the number of sheets having an image formed thereon becomes larger than a predetermined number. However, when the number of sheets having an image formed thereon becomes larger than a predetermined number, the synchronous waveform signal may be corrected with the use of predetermined correction information, before an image forming process is performed.

FIG. 9 shows an example of a correction table TB1 that stores correction information. The correction table TB1 is prepared in advance and is stored in the storage unit 11.

As shown in FIG. 9, in the correction table TB1, cumulative image formation sheet numbers and amplitude level correction values are associated in one-to-one correspondence as the correction information. For example, when the cumulative image formation sheet number reaches 100, the control unit 10 sets the amplitude level of the synchronous waveform signal at 1.5, according to the correction table TB1.

Instead of the cumulative image formation sheet number, the numerical value of the temperature in the vicinity of the fixing nip portion may be used, for example. In this case, a temperature sensor is provided in the vicinity of the fixing nip portion, and, when the measured value reaches a predetermined value, the amplitude level of the synchronous waveform signal is corrected.

Further, in the above described embodiment, to achieve a higher accuracy, a drive signal of the opposite phase that cancels the extracted synchronous waveform signal is generated and is input to the driving motor M. However, the extracted synchronous waveform signal may not be canceled, but a drive signal for weakening the amplitude of the synchronous waveform signal may be input to the driving motor M. In this manner, it is possible to achieve an effect to prevent degradation of image position accuracy due to eccentricity of the driving roller.

Also, a signal other than a waveform signal may be acquired, as long as the signal indicates a change in the image forming position with respect to the paper sheet or a change in the sheet conveyance velocity. In such a case, a signal corresponding to one revolution of the pressure roller 182 detected by the detector is extracted from the acquired signal, and a signal for weakening the change in the image forming position or the change in the sheet conveyance velocity indicated by the extracted signal is input to the driving motor M of the pressure roller 182.

Further, in the examples described in the above embodiment, the driving signal for the pressure roller 182 of the image fixer 18 is generated. However, the drive signal may also be used for a driving roller located in a position that affects image position deviation, such as another roller (a resist roller, for example) that nips a paper sheet when the paper sheet is nipped by the transfer nip portion.

Modifications may be made to the specific configurations and the specific operations of the respective components constituting the image forming apparatus 1, without departing from the scope of the invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
a driving roller that conveys a paper sheet;
a detector that detects a desired point on the driving roller;
a reader that reads a pattern image formed on the paper sheet; and
a hardware processor that:
acquires a waveform signal indicating one of a change in an image forming position with respect to the paper sheet and a change in a sheet conveyance velocity;
extracts a synchronous waveform signal from the waveform signal acquired by the hardware processor, the synchronous waveform signal being synchronized with one revolution of the driving roller, the one revolution being detected by the detector;
inputs a drive signal to a drive source of the driving roller, the drive signal being input to weaken an amplitude of the synchronous waveform signal extracted by the hardware processor; and
acquires a position waveform signal from a difference value obtained as a result of comparison between a predetermined ideal image forming position and a position of the pattern image read by the reader.

2. The image forming apparatus according to claim 1, wherein the hardware processor inputs a drive signal of an opposite phase to the drive source, the drive signal of the opposite phase canceling the synchronous waveform signal extracted by the hardware processor.

3. The image forming apparatus according to claim 1, further comprising
a fixer that fixes an image on a paper sheet while nipping and conveying the paper sheet with a fixing nip, wherein
the driving roller is one of rollers forming the fixing nip.

4. The image forming apparatus according to claim 1, wherein the hardware processor acquires a waveform signal from which periodic components of conveyance rollers located on upstream and downstream sides of the driving roller have been removed.

5. The image forming apparatus according to claim 1, wherein a roller diameter of the driving roller is different from a roller diameter of conveyance rollers located on upstream and downstream sides of the driving roller.

6. The image forming apparatus according to claim 1, wherein,
after the synchronous waveform signal is extracted by the hardware processor, the hardware processor inputs the synchronous waveform signal to the drive source of the driving roller in image forming processes for a predetermined number of sheets, and when the number of sheets on which an image has been formed becomes larger than the predetermined number, the hardware processor extracts a new synchronous waveform signal.

7. The image forming apparatus according to claim 1, wherein, after the synchronous waveform signal is extracted by the hardware processor, the hardware processor inputs the synchronous waveform signal to the drive source of the driving roller in image forming processes for a predetermined number of sheets, and when the number of sheets on which an image has been formed becomes larger than the predetermined number, the hardware processor corrects the synchronous waveform signal by using predetermined correction information before performing an image forming process.

8. The image forming apparatus according to claim 1, wherein the reader reads the pattern image formed on a plurality of paper sheets, and the hardware processor acquires the position waveform signal by calculating an average value of a plurality of difference values obtained as a result of comparison between the ideal image forming position and a plurality of pattern image positions.

9. The image forming apparatus according to claim 1, wherein, when image forming processes are successively performed on a plurality of paper sheets, an interval between the paper sheets is equal to a length that is not an integral multiple of a circumferential length of the driving roller.

10. An image forming apparatus according to comprising:
a driving roller that conveys a paper sheet;
a detector that detects a desired point on the driving roller;
a sensor that detects passing of the paper sheet; and
a hardware processor that:
acquires a waveform signal indicating one of a change in an image forming position with respect to the paper sheet and a change in a sheet conveyance velocity;
extracts a synchronous waveform signal from the waveform signal acquired by the hardware processor, the synchronous waveform signal being synchronized with one revolution of the driving roller, the one revolution being detected by the detector;
inputs a drive signal to a drive source of the driving roller, the drive signal being input to weaken an amplitude of the synchronous waveform signal extracted by the hardware processor;
calculates a circumferential velocity of the driving roller by calculating, from a result of detection performed by the sensor, a passage time of the paper sheet through the driving roller; and
acquires a velocity waveform signal from a result of calculation performed by the hardware processor for a plurality of paper sheets.

11. The image forming apparatus according to claim 10, wherein, when the sensor is disposed on a downstream side of the driving roller, a distance from the driving roller to the sensor is equal to a length that is not an integral multiple of a circumferential length of the driving roller.

12. A non-transitory recording medium storing a computer readable program for causing a computer of an image forming apparatus to perform:

detecting a desired point on a driving roller that conveys a paper sheet;

acquiring a waveform signal indicating one of a change in an image forming position with respect to the paper sheet and a change in a sheet conveyance velocity;

extracting a synchronous waveform signal from the waveform signal acquired by the acquiring, the synchronous waveform signal being synchronized with one revolution of the driving roller, the one revolution being detected by the detecting;

inputting a drive signal to a drive source of the driving roller, the drive signal being input to weaken an amplitude of the synchronous waveform signal extracted by the extracting;

reading a pattern image formed on the paper sheet with a reader; and acquiring a position waveform signal from a difference value obtained as a result of comparison between a predetermined ideal image forming position and a position of the pattern image read by the reader.

13. The non-transitory recording medium according to claim 12, comprising:

reading the pattern image formed on a plurality of paper sheets with the reader; and acquiring the position waveform signal by calculating an average value of a plurality of difference values obtained as a result of comparison between the ideal image forming position and a plurality of pattern image positions.

14. The non-transitory recording medium according to claim 12, wherein when image forming processes are successively performed on a plurality of paper sheets, an interval between the paper sheets is equal to a length that is not an integral multiple of a circumferential length of the driving roller.

15. A non-transitory recording medium storing a computer readable program for causing a computer of an image forming apparatus to perform:

detecting a desired point on a driving roller that conveys a paper sheet;

acquiring a signal indicating one of a change in an image forming position with respect to the paper sheet and a change in a sheet conveyance velocity;

extracting a signal corresponding to one revolution of the driving roller from the signal acquired by the acquiring, the one revolution of the driving roller being detected by the detecting;

inputting a signal to a drive source of the driving roller, the signal being input to weaken the one of the change in the image forming position and the change in the sheet conveyance velocity, the one of the changes being indicated by the signal extracted by the extracting;

detecting a passing of the paper sheet with a sensor;

calculating a circumferential velocity of the driving roller by calculating, from a result of detection performed by the sensor, a passage time of the paper sheet through the driving roller; and acquiring a velocity waveform signal from a result of calculation for a plurality of paper sheets.

16. The non-transitory recording medium according to claim 15, wherein when the sensor is disposed on a downstream side of the driving roller, a distance from the driving roller to the sensor is equal to a length that is not an integral multiple of a circumferential length of the driving roller.

* * * * *